United States Patent
Tanaka et al.

(12)

(10) Patent No.: US 6,526,842 B1
(45) Date of Patent: Mar. 4, 2003

(54) SHIFTING APPARATUS FOR A VEHICLE TRANSMISSION

(75) Inventors: Masayuki Tanaka, Shizuoka-ken (JP); Masayuki Shinmura, Shizuoka-ken (JP)

(73) Assignee: Kabushiki Kaisha Atsumitec (JP)

( * ) Notice: Subject to any disclaimer, the term of this patent is extended or adjusted under 35 U.S.C. 154(b) by 0 days.

(21) Appl. No.: 09/527,396

(22) Filed: Mar. 16, 2000

(30) Foreign Application Priority Data

Apr. 2, 1999 (JP) .......................................... 11-096838

(51) Int. Cl.7 .......................... G05G 1/04; B60K 20/00; F16F 7/12
(52) U.S. Cl. .................... 74/473.1; 74/473.3; 280/419; 180/336
(58) Field of Search .......................... 74/473.1, 473.3, 74/473.33; 296/188, 189; 180/336; 248/548; 280/419

(56) References Cited

U.S. PATENT DOCUMENTS

| 5,287,743 A | * | 2/1994 | Doolittle et al. .......... 74/471 R |
| 5,992,261 A | * | 11/1999 | Iwata et al. ................ 74/473.1 |
| 6,082,216 A | * | 7/2000 | Watanable et al. ......... 74/473.3 |
| 6,286,385 B1 | * | 9/2001 | Nishimura et al. ........ 74/473.3 |

FOREIGN PATENT DOCUMENTS

| JP | 62-245417 | * | 10/1987 |
| JP | 63-20515 | * | 1/1988 |
| JP | 6-109108 | * | 4/1994 |
| JP | 09030281 | | 2/1997 |
| JP | 10016597 | | 1/1998 |
| JP | 10030669 | | 2/1998 |
| JP | 10086689 | | 4/1998 |
| JP | 11-264456 | * | 9/1999 |
| WO | WO 98/59189 | | 12/1998 |

* cited by examiner

*Primary Examiner*—David A. Bucci
*Assistant Examiner*—Colby Hansen
(74) *Attorney, Agent, or Firm*—Harness, Dickey & Pierce, P.L.C.

(57) ABSTRACT

It is an object of the present invention to provide a shifting apparatus for a vehicle transmission which can easily adjust the initial load and the following shock load over a predetermined stroke with keeping the static strength of the shock absorbing members. According to the present invention, there is provided a shifting apparatus for a vehicle transmission comprising a shift operation section for supporting an operation lever and mounting members for arranging the shift operation section at an instrument panel portion of the vehicle or at a near region thereof characterized in that said mounting members are adapted to mount the shift operation section on a body of the vehicle at least two places thereof, and each of the mounting members is provided with a first shock absorbing member adapted to be broken to absorb an initial shock load as well as a second shock absorbing member adapted to be deformed or broken over a predetermined stroke to absorb a shock load following the initial shock load when a shock load exceeding a predetermined value is applied to the shift operation section.

18 Claims, 11 Drawing Sheets

SHIFTING APPARATUS FOR A VEHICLE TRANSMISSION

BACKGROUND OF THE INVENTION

1. Field of the Invention

The present invention relates to a shifting apparatus for a vehicle transmission arranged at an instrument panel portion of the vehicle or at a near region thereof, and more particularly to a shifting apparatus for a vehicle transmission which is able to absorb the shock when the shock load is applied to a shift operation section of the shifting apparatus.

2. Description of Background Art

In general, although the shifting apparatus including a shift lever for a manual transmission or a selector lever for an automatic transmission is arranged at a center console between a driver's seat and an assistant driver's seat, there has been recently developed a shifting apparatus designed to be arranged at an instrument panel of the vehicle or at a near region thereof.

That is, the arrangement of the shifting apparatus for a vehicle transmission at a instrument panel portion of the vehicle or at a near region thereof makes it possible to ensure a sufficient space for front seats and thus to prevent the passengers from erroneously touching the shift lever or selector lever, and also to ensure an arrangement of the shift lever or selector lever near a steering wheel and thus enabling quick motion of the driver's hand from the steering wheel to the shift lever or selector lever, and vice versa.

One example of technology of shock absorbing means for absorbing the shock applied to the operation lever such as the shift lever or selector lever is disclosed, for example, in Japanese laid-open patent publication No. 16597/1998 (hereinafter referred to Prior Art 1).

Such a shock absorbing means comprises a supporting member for pivotably supporting a shift operation section around a point on the body of a vehicle and a rod-shaped member interposed between the shifting apparatus and the supporting member of the vehicle. One end of the rod-shaped member is connected to the shifting apparatus and the other end thereof is connected to the supporting member of the vehicle so that the rod-shaped member restrains the pivotal movement of the shift operation section and absorbs the shock load with permitting the pivotal movement of the shift operation section due to breakage of the rod-shaped member or release thereof from the supporting member or the shifting apparatus when a shock load exceeding a predetermined value is applied to the shifting apparatus.

Another shock absorbing means for effectively absorbing both the initial shock load and the shock load following the initial shock load is disclosed in Japanese laid-open patent publication No. 30669/1998 (hereinafter referred to Prior Art 2).

Figure 17:
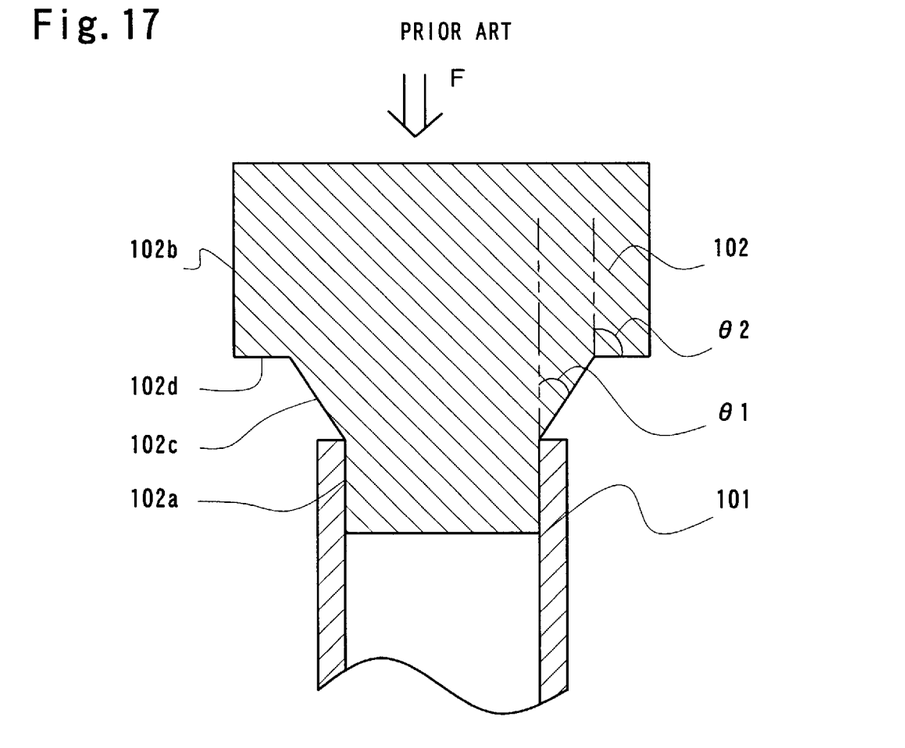
FIG. 17 is a sectional view of a shock absorbing means of the prior art.

Such a shock absorbing means is used for a shaft of a shift lever and comprises a cylindrical tube 101 having predetermined dimensions and an energy absorbing member 102, a portion thereof being inserted in the cylindrical tube 101 as shown in FIG. 17.

The energy absorbing member 102 has a distal end 102a having a diameter substantially corresponding to the inner diameter of the cylindrical tube 101, an enlarged diameter portion 102b having a diameter larger than that of the distal end 102a, a diverging portion 102c diverging from the distal end 102a to the enlarged diameter portion 102b at an angle θ1, and a shoulder portion 102d connecting the diverging portion 102c and the enlarged diameter portion 102b at an angle θ2 which is larger than the angle θ1.

When a force F is applied to the energy absorbing member 102 by a certain shock, the energy absorbing member 102 is forced into the cylindrical tube 101 and thus the shock load is absorbed by the deformation of the opening of the cylindrical tube 101, the diverging portion 102c and the enlarged diameter portion 102b.

Figure 18:
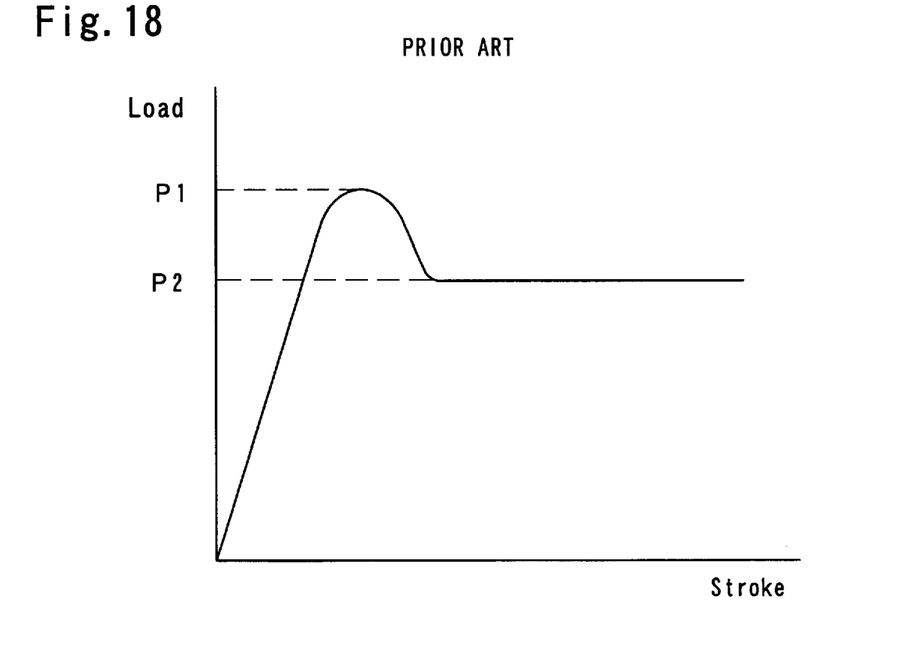
FIG. 18 is a graph showing an ideal shock absorbing characteristic curve.

The initial shock load P1 and the following shock load P2 are determined by setting the angle θ1 of the diverging portion 102c and the angle θ2 of the shoulder portion at the manufacturing stage of the energy absorbing member 102. That is, the initial shock load P1 can be set at a relatively low level by reducing the angle θ1, and the following shock load P2 can be set at a relatively high level by increasing the angle θ2. Accordingly, it is possible to obtain an ideal load-displacement curve shown in FIG. 18 by appropriately setting the angles θ1 and θ2.

However, both the Prior Arts 1 and 2 include following problems. That is, in the Prior Art 1, since the shift operation section becomes a free condition separated from the body of the vehicle after the rod-shaped member having been broken or released from its connection by the shock load, it is impossible to absorb the shock load after the breakage or disconnection of the rod-shaped member.

In the Prior Art 2, although it is possible to set the initial shock load and the following load, it is difficult to properly set the initial shock load and to ensure the static strength of the structural members i.e. the energy absorbing member, since the absorption of the shock load is carried out based only on the deformation of the structural members not on the breakage thereof. In addition, since both the initial shock load and the following shock load are adjusted by only one mounting portion, it is difficult to properly set the design shock load.

SUMMARY OF THE INVENTION

It is, therefore, an object of the present invention to provide a shifting apparatus for a vehicle transmission being able to easily adjust the initial shock load and the following shock load over a predetermined stroke in which shock loads each having different characteristic curve such as shown in FIGS. 13(a) and (b) are absorbed by separate mounting portions and the initial shock load is absorbed by the breakage of the shock absorbing members not by the deformation thereof in order to ensure the static strength of the shock absorbing members.

For achieving the object mentioned, there is provided, according to the present invention, a shifting apparatus for a vehicle transmission comprising a shift operating section for supporting an operation level and mounting members for arranging the shift operation section at an instrument panel portion of the vehicle or at a near region thereof characterized in that said mounting members are adapted to mount the shift operation section on a body of the vehicle at least two places thereof, and each of the mounting members is provided with a first shock absorbing member adapted to be broken to absorb an initial shock load as well as a second shock absorbing member adapted to be deformed or broken over a predetermined stroke to absorb a shock load following the initial shock load when a shock load exceeding a predetermined value is applied to the shift operation section.

Figure 13:
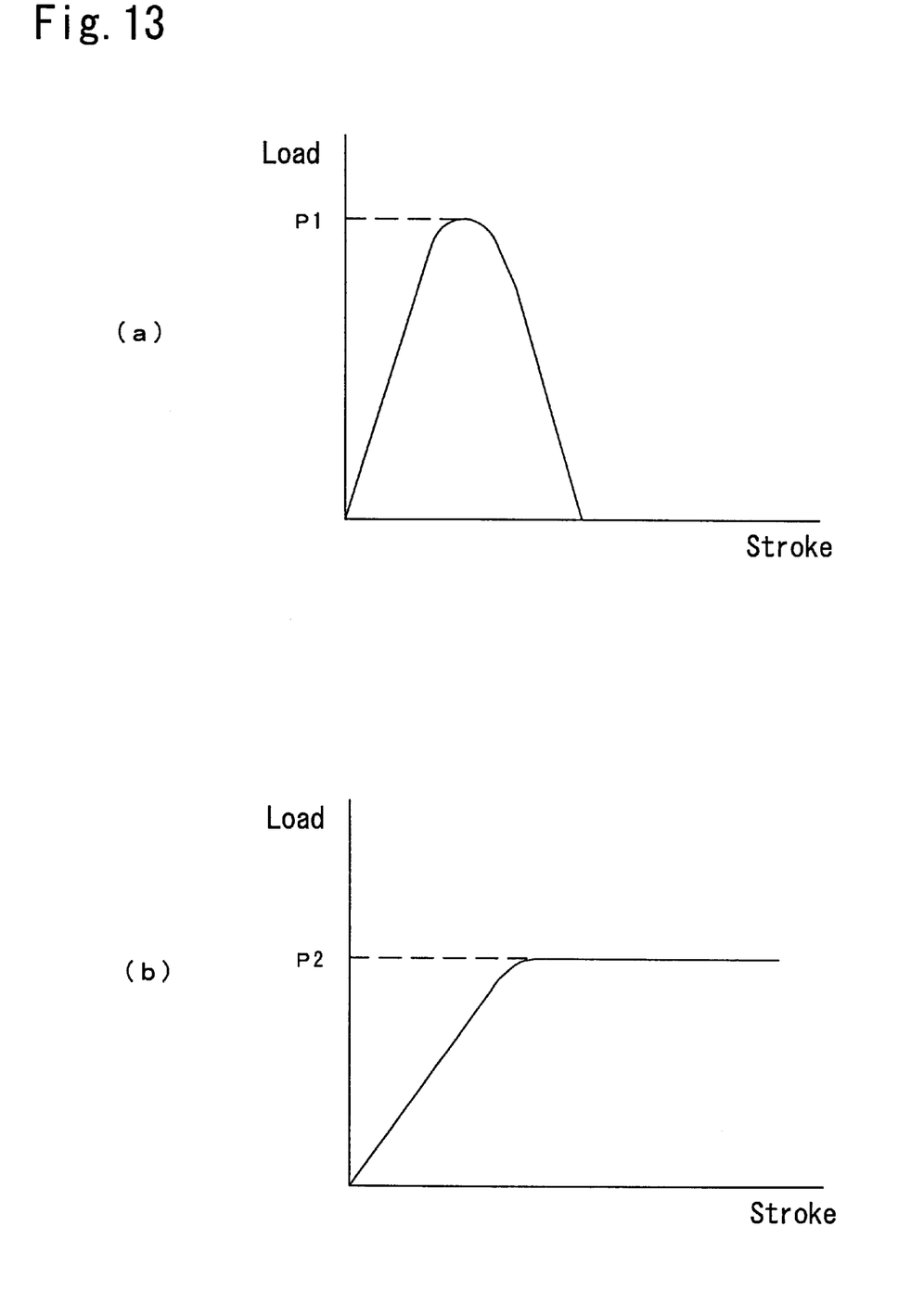

According to this structure, the first shock absorbing member is broken and the second shock absorbing member is broken or deformed over a predetermined stroke when the shock load is applied to the shift operation section. That is, the initial shock load P1 and the following shock load P2 each having a characteristic curve respectively shown in FIGS. 13(*a*) and (*b*) are separately absorbed by separate shock absorbing members.

Additionally, there is provided a shifting apparatus for a vehicle transmission wherein said first shock absorbing member is a rib formed integrally with the shift operation section and adapted to be broken by each of the mounting member displaced relatively to the shift operation section when said shock load is applied to the shift operation section.

According to this structure, the initial shock load is absorbed by the breakage of the ribs formed integrally with the shift operation section.

Further, there is provided a shifting apparatus for a vehicle transmission wherein said second shock absorbing member comprises a plate-shaped portion extending from the mounting member and a restraining portion formed integrally with the shift operation section for restraining the plate-shaped portion.

According to this structure, the shock load is absorbed by the breakage of the restraining portion acted by the plate-shaped portion, or by the deformation of the plate-shaped portion acted by the restraining portion when the mounting members and the shift operation section are relatively moved by the application of the shock load. Since the breakage of the restraining portion is continuously carried out by the region in which the restraining portions exist, the shock load is absorbed over a predetermined stroke.

Furthermore, there is provided a shifting apparatus for a vehicle transmission wherein said plate-shaped portion is formed with a slit for aiding the deformation of the plate-shaped portion when the shock load is applied to the shift operation section.

According to this structure, each plate-shaped portion deforms along its slit and absorbs the shock load when the shock load is applied.

In addition, there is provided a shifting apparatus for a vehicle transmission wherein a said plate-shaped portion is formed with projections for deforming or breaking the restraining portion during relative movement between the plate-shaped portion and the shift operation section when the shock load is applied to the shift operation section.

According to this structure, the restraining portion is broken by the projections when the plate-shaped portion and the shift operation section are relatively moved by the application of the shock load.

Also, there is provided a shifting apparatus for a vehicle transmission wherein the surfaces of the projections of the plate-shaped portion is offset from the direction of the relative movement between the plate-shaped portion and the shift operation section.

According to this structure, a degree of the breakage of the projections is adjusted by the offset angle.

Further, there is provided a shifting apparatus for a vehicle transmission wherein said first shock absorbing member and said second shock absorbing member comprise insert potions connecting the shift operation section and the mounting member.

Furthermore, there is provide a shifting apparatus for a vehicle transmission wherein said first shock absorbing member comprises pin-shaped insert portions.

Additionally, there is provided a shifting apparatus for a vehicle transmission wherein said second shock absorbing member comprises plate-shaped insert portions.

BRIEF DESCRIPTION OF THE DRAWINGS

Preferred embodiments of the present invention will be described with reference to the accompanied drawings in which;

FIG. 13(*a*) is a graph showing the shock absorbing characteristic curve of the first shock absorbing member;

FIG. 13(*b*) is a graph showing the shock absorbing characteristic curve of the second shock absorbing member;

DESCRIPTION OF THE PREFERRED EMBODIMENTS

In usual, there is provided an instrument panel at a front part of a cabin of a vehicle in which several kinds of meters, switches, a radio, a stereo system and its speaker, air outlets of an air conditioning unit, etc. are arranged. The shifting apparatus for a vehicle transmission is adapted to be mounted on the instrument panel or on a near region thereof.

A first embodiment of the present invention will be described.

Figure 9:
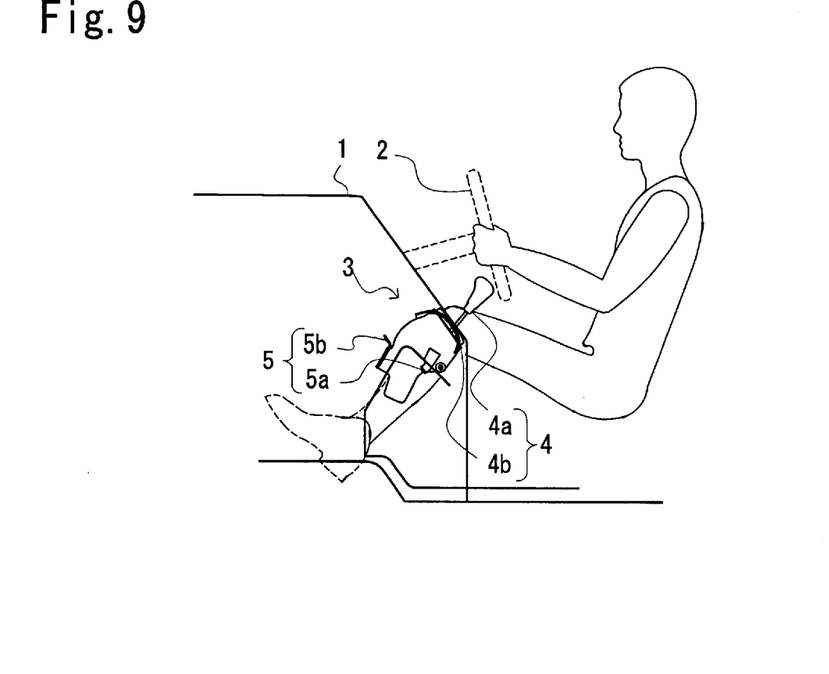
FIG. 9 is a schematic view of the shifting apparatus of FIG. 1 mounted on the instrument panel of a vehicle.

The shifting apparatus for a vehicle transmission shown in this embodiment is that used for the speed shift operation of an automatic transmission and is mounted on an instrument panel 1 as shown in FIG. 9. A reference numeral 2 denotes a steering wheel.

As shown in FIGS. 1 through 7, the shifting apparatus for a vehicle transmission 3 comprises, as its main components, mounting brackets 5 (5a and 5b) as a mounting member, ribs 6 as a first shock absorbing member, plate-shaped portions 7 and L-shaped members 14 as a second shock absorbing member.

A shift operation section 4 is a section by which a driver of vehicle carries out the speed shifting operation of the vehicle and comprises, as its main components, a body 12 of the shifting apparatus for a vehicle transmission, a selector lever 4a, and a decorating panel 4b for covering the cabin side of the shift operation section 4.

The decorating panel 4b is formed with a gate-shaped groove 16 along which the selector lever 4a can move. A panel 23 having an indication of the shift range such as "P, R, N, D, 2, 1" is arranged on the panel 23.

Figure 8:
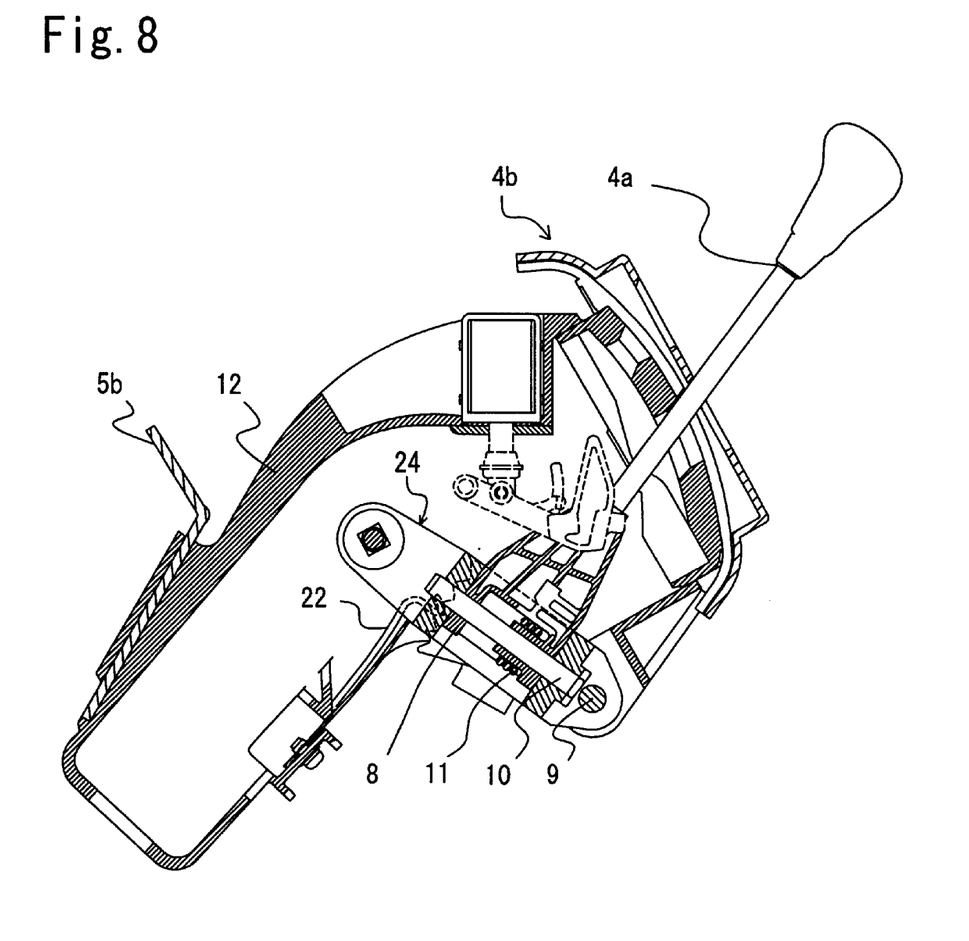
FIG. 8 is a sectional view taken along a line VIII—VIII in FIG. 1.

As shown in FIG. 8, a lever supporting member 8 formed on the distal end of the selector lever 4a is arranged within the body 12 of the shifting apparatus for vehicle transmission. A shaft pin 9 for enabling a movement of the selector lever 4a in fore and aft directions as well as a shaft pin 10 enabling a movement of the selector lever 4a in a lateral direction are inserted in the lever supporting member 8 through a wire bracket 24.

In addition, the lever supporting member 8 is provided with a spring 11 for urging the lever supporting member 8 toward the panel 23. The shift lever 4a can be held at a desired shift range with a detent spring 22 one end of which is secured on the body 12 engaging a detent portion formed on the wire bracket 24.

The wire bracket 24 and the transmission of a vehicle is connected each other through a push-pull wire (not shown) and the output corresponding to the motion of the wire bracket 24 caused by the operation of the selector lever 4a can be transmitted to the automatic transmission.

The mounting bracket 5 is used for arranging the shift operation section 4 on the instrument panel 1 and comprises two mounting brackets 5a mounted on either side of the body 12 and one mounting bracket 5b which are formed as metal brackets. The mounting brackets 5a and 5b are formed with bolt holes 5aa and 5ab; 5ba and 5bb respectively so as to secure the body 12 of he shifting apparatus on a bracket 21 (FIG. 2) supported on the body of vehicle by bolts passed through the bolt holes.

Figure 1:
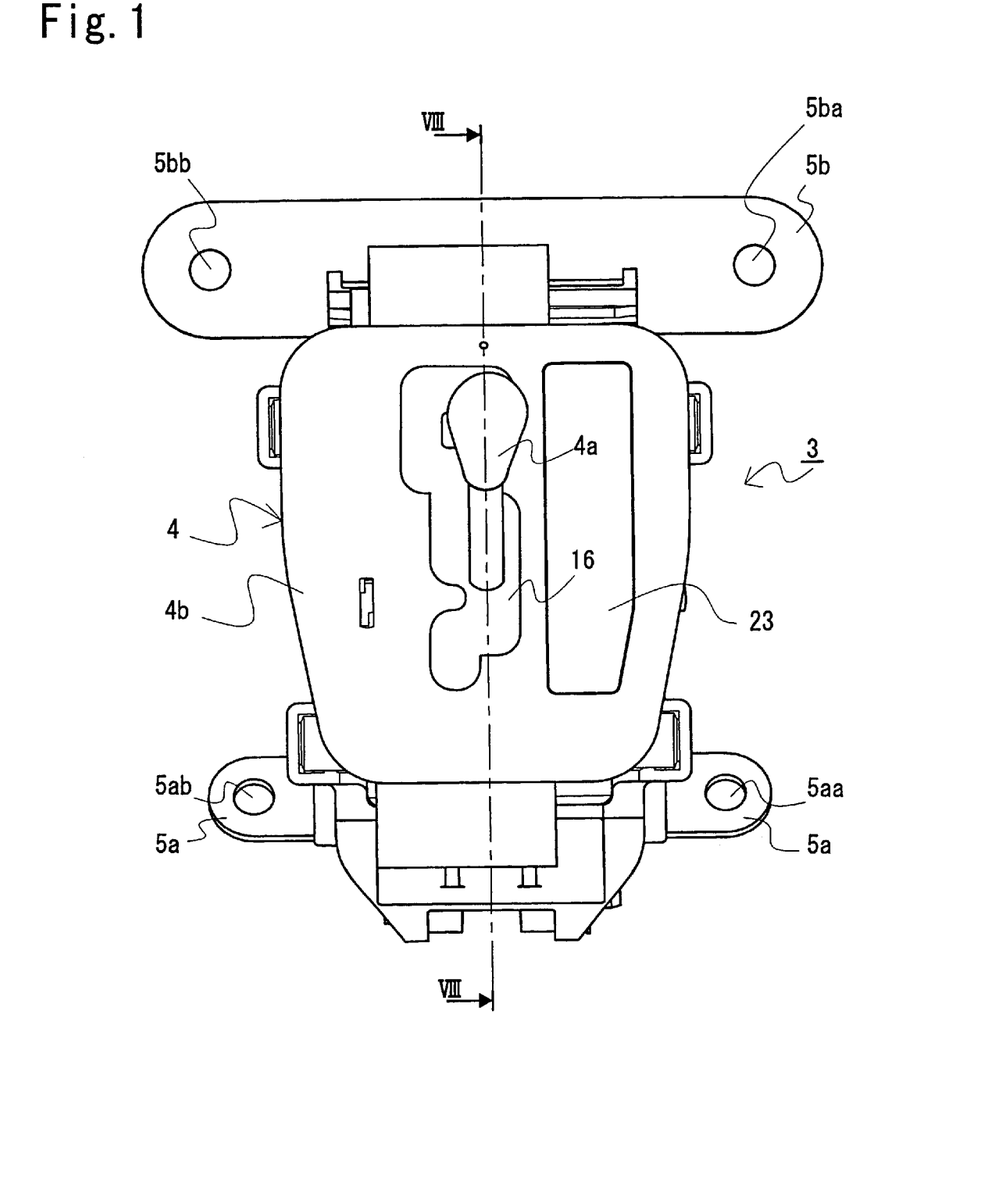
FIG. 1 is a plan view of a first embodiment of the shifting apparatus for a vehicle transmission of the present invention.
Figure 2:
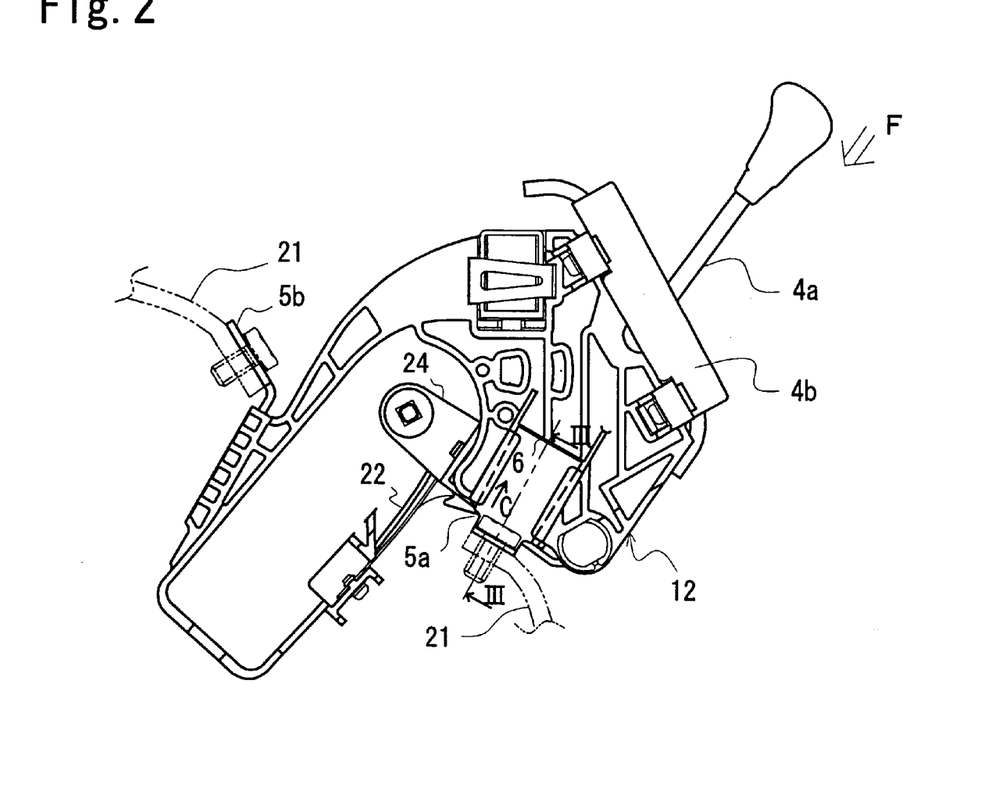
FIG. 2 is a side elevation view of the shifting apparatus of FIG. 1.
Figure 3:
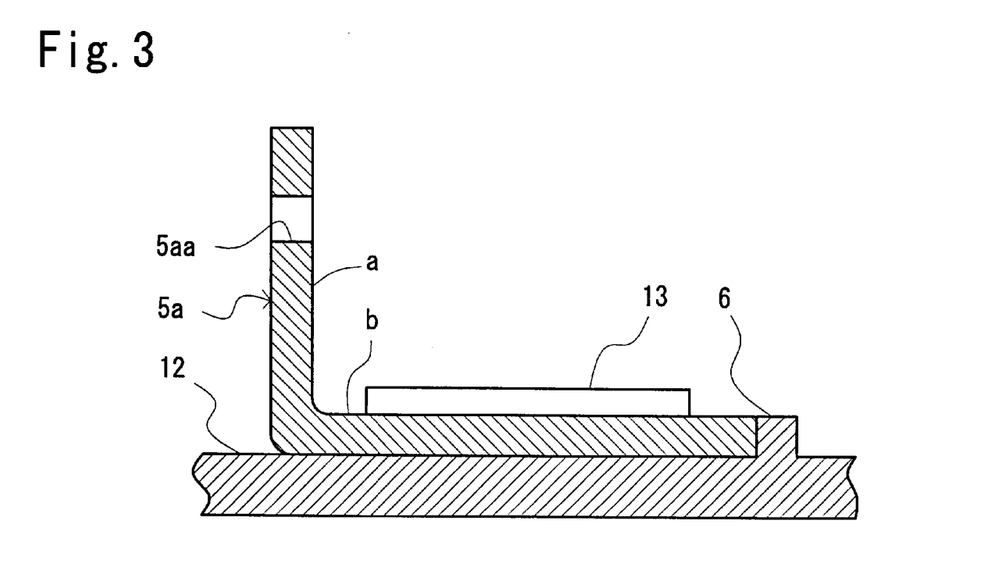
FIG. 3 is a sectional view taken along a line III—III in FIG. 2.
Figure 4:
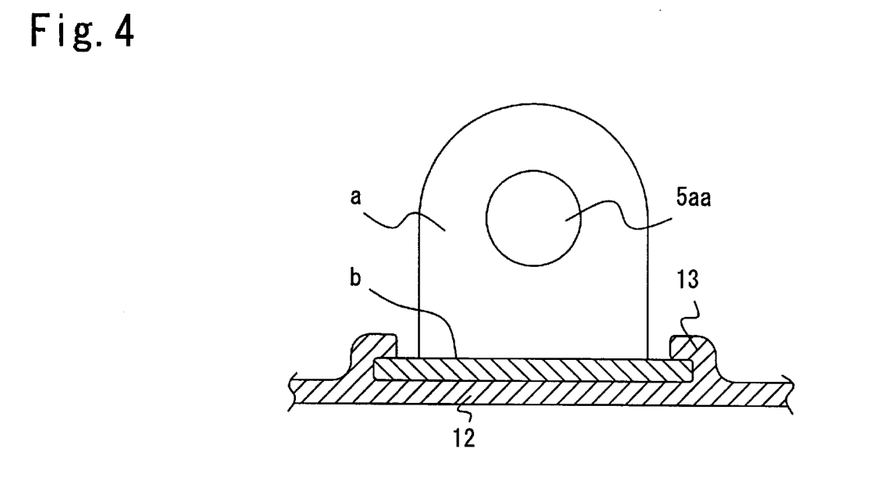
FIG. 4 is a sectional view of a first shock absorbing member in the shifting apparatus of FIG. 1.

As shown in FIG. 2 through FIG. 4, the mounting bracket 5a is formed into a L-shaped configuration comprising a flat portion "a" having bolt holes 5aa and 5ab and a flat portion "b" substantially perpendicular to the flat portion "a". The sides of the flat portion "b" are restrained by L-shaped rails formed by L-shaped members 13 projected from the body 12 of the shifting apparatus. The distal end of the mounting bracket 5a (i.e. the end opposite to the flat portion "a") abuts against a rib 6 and is restrained thereby. It is preferable to form the L-shaped member 13 integrally with the body 12 of the shifting apparatus in order to reduce the production cost and to increase the strength thereof.

According to the structure described above, the mounting bracket 5a secured to the bracket 21 supported on the body of vehicle can slide along the L-shaped rails 13 toward a direction shown by an arrow "c" in FIG. 2 when the shock load F is applied to the shift operation section, and then can break the rib 6. The initial shock load P1 is absorbed by this breakage of the rib 6. The setting value of breakage of the rib 6 by the shock load F can be adjusted by changing the thickness and the structure of the rib 6.

Since the shock load F is absorbed by the breakage of the rib 6, it is possible to increase the static strength of the structural members as compared with the case in which the shock load is absorbed by the deformation of the structural members.

Figure 5:
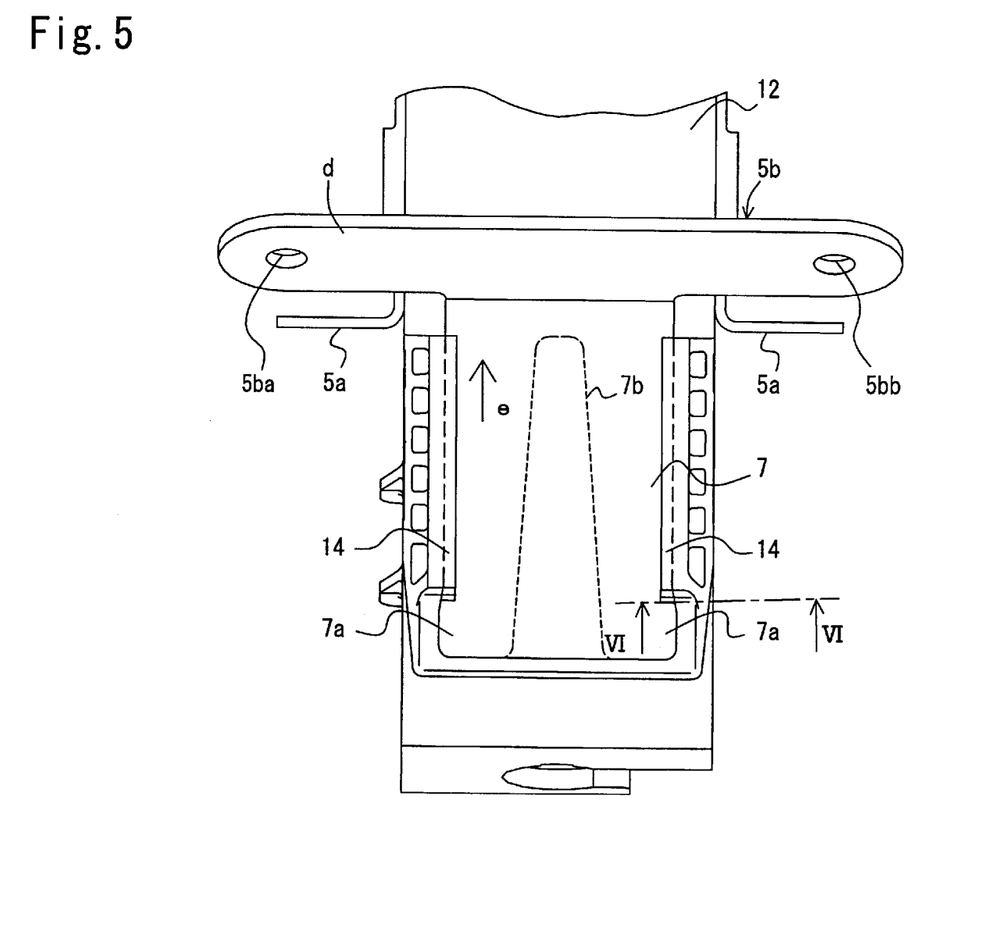
FIG. 5 is a sectional view of a second shock absorbing member in the shifting apparatus of FIG. 1.
Figure 6:
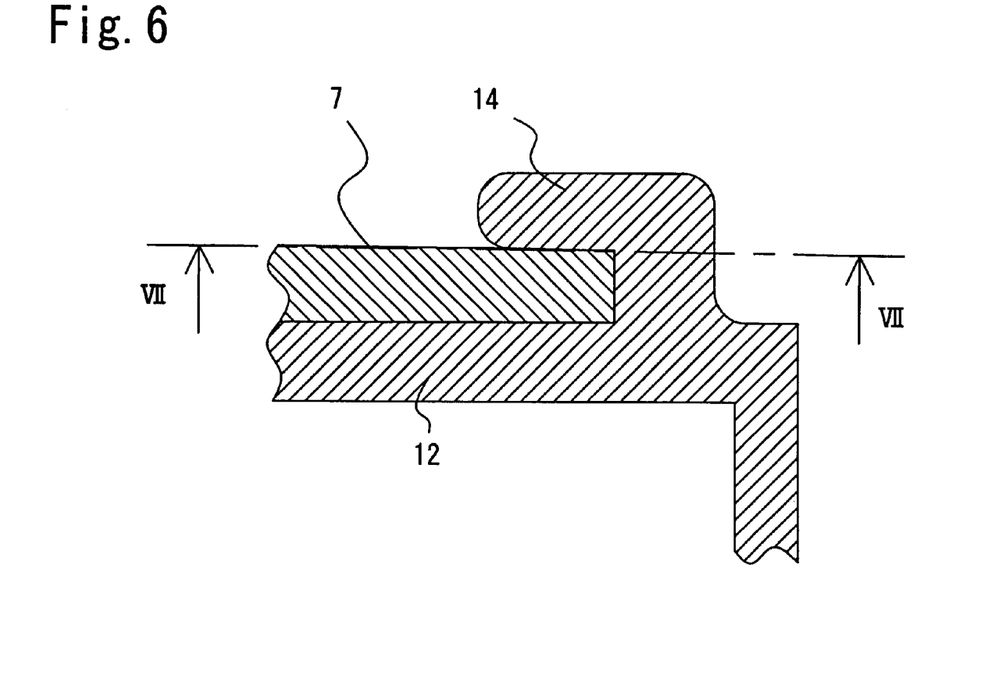
FIG. 6 is a sectional view taken along a line VI—VI in FIG. 5.
Figure 7:
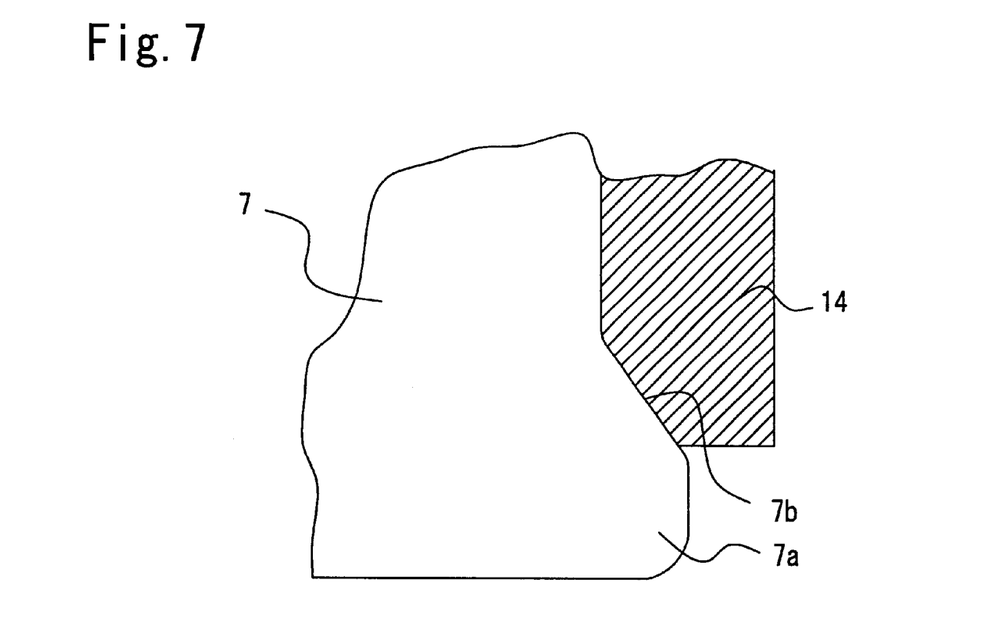
FIG. 7 is a sectional view taken along a line VII—VII in FIG. 6.

As shown in FIG. 5 through FIG. 7, the mounting bracket 5b is formed into an L-shaped configuration comprising a flat portion "d" having bolt holes 5ba and 5bb and a plate-shaped portion 7 which is a flat portion substantially perpendicular to the flat portion "d". Similarly to the L-shaped member 13, the sides of the plate-shaped portion 7 are restrained by a L-shaped rails formed by L-shaped members 14 projected from the body 12 of the shifting apparatus, the L-shaped member 14 corresponding to the "restraining portion" in the present invention. It is preferable to form the L-shaped member 14 integrally with the body 12 of the shifting apparatus in order to reduce the production cost and to increase the strength thereof The plate-shaped portion 7 is formed with projections 7a laterally projecting from the sides thereof and a slit 7b along its central axis.

As shown in FIG. 7, the surfaces 7b of the projections 7a of the plate-shaped portion 7 abutting the L-shaped member 14 is offset from the direction of the relative movement between the plate-shaped portion 7 and the shift operation section 4 at a predetermined angle. The setting value of breakage of the L-shaped member 14 broken by the projections 7a as well as the setting value of deformation of the plate-shaped portion 7 can be adjusted by changing the offset angle of the projections 7a.

According to the structure described above, since the mounting bracket 5b is secured to the bracket 21 supported on the body of vehicle, the plate-shaped portion 7 can slide along the L-shaped rails toward a direction shown by an arrow "e" in FIG. 5 when the shock load F is applied to the shift lever 4a. During which, the projections 7a slide with breaking the L-shaped members 14 and the plate-shaped portion 7 is deformed along its slit 7b.

Since the shock load P2 is absorbed by the breakage of the L-shaped member 14 and the deformation of the plate-shaped portion 7, it is possible to absorb the shock load P2 over a predetermined stroke. The setting value of breakage of the L-shaped member 14 by the shock load F can be adjusted by changing the rigidity and the dimension of the projections 7a and the setting value of deformation of the plate-shaped portion 7 by the shock load F can be adjusted by changing the width, the longitudinal dimension and the configuration etc. of the slit 7b.

Although it has described the first embodiment of the present invention, the present invention is not limited to that illustrated and described herein. For example, the gate-shaped groove 16 can be changed to a straight groove.

In addition, it is possible to dispense with the slit 7b. If dispensing with the slit 7b, it is preferable to adjust the setting value of deformation of the plate-shaped portion 7 by the shock load F by appropriately changing the material or configuration of the mounting bracket 5b.

According to the first embodiment of the present invention, both the initial shock load P1 shown in FIG. 13(a) and the shock load P2 over a predetermined stroke shown in FIG. 13(b) are adjustable and thus it is possible to easily obtain the ideal load-displacement curve (FIG. 18) which is a resultant curve of the initial shock load P1 and the shock load P2. That is, it is possible to obtain a desirable relation between the initial shock load P1 and the shock load P2 by appropriately adjusting several parameters as to the rib 5 or the plate-shaped portion 7.

Then a second embodiment of the present invention will be described.

The shifting apparatus for a vehicle transmission shown in this embodiment is that used for the speed shift operation of a manual transmission and is mounted on an instrument panel 1 or near region thereof similarly to the first embodiment.

Figure 10:
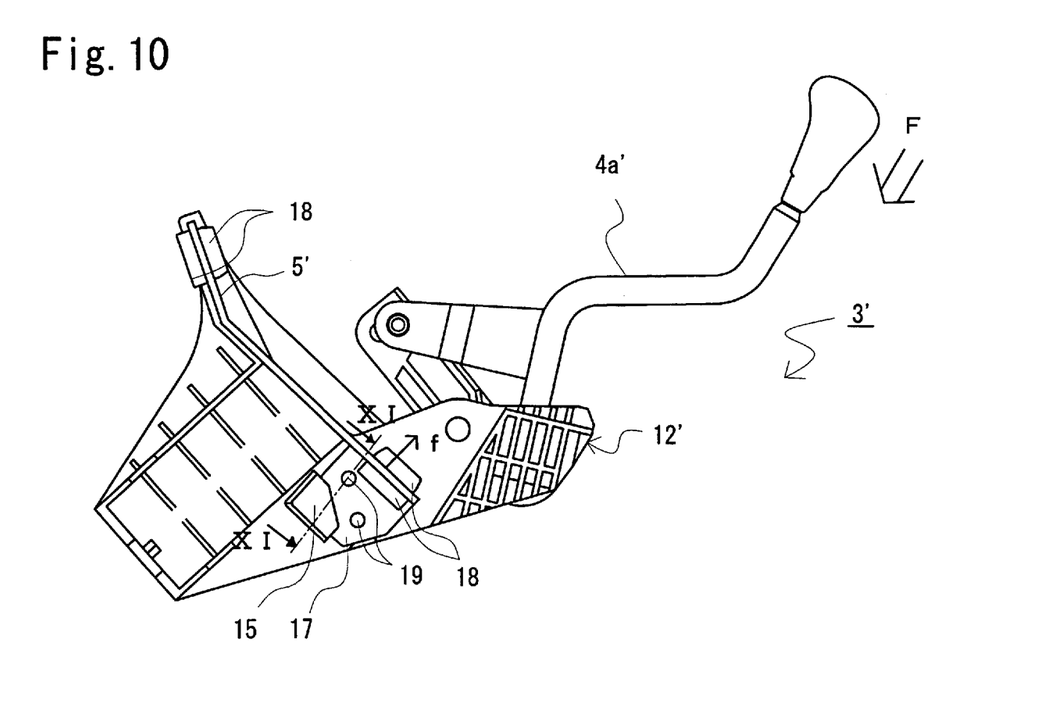
FIG. 10 is a side elevation view of a second embodiment of the shifting apparatus for a vehicle transmission of the present invention.
Figure 11:
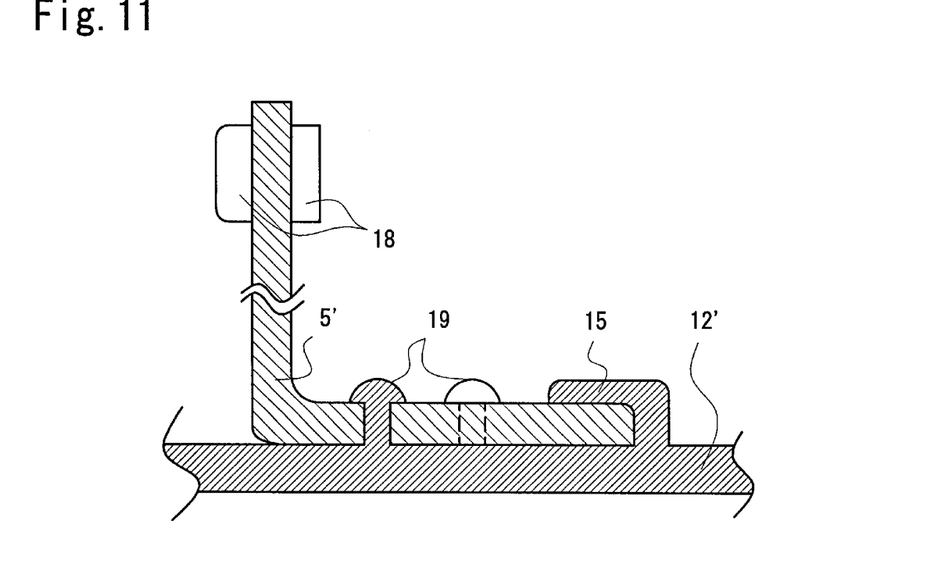
FIG. 11 is a sectional view taken along a line XI—XI in FIG. 10.
Figure 12:
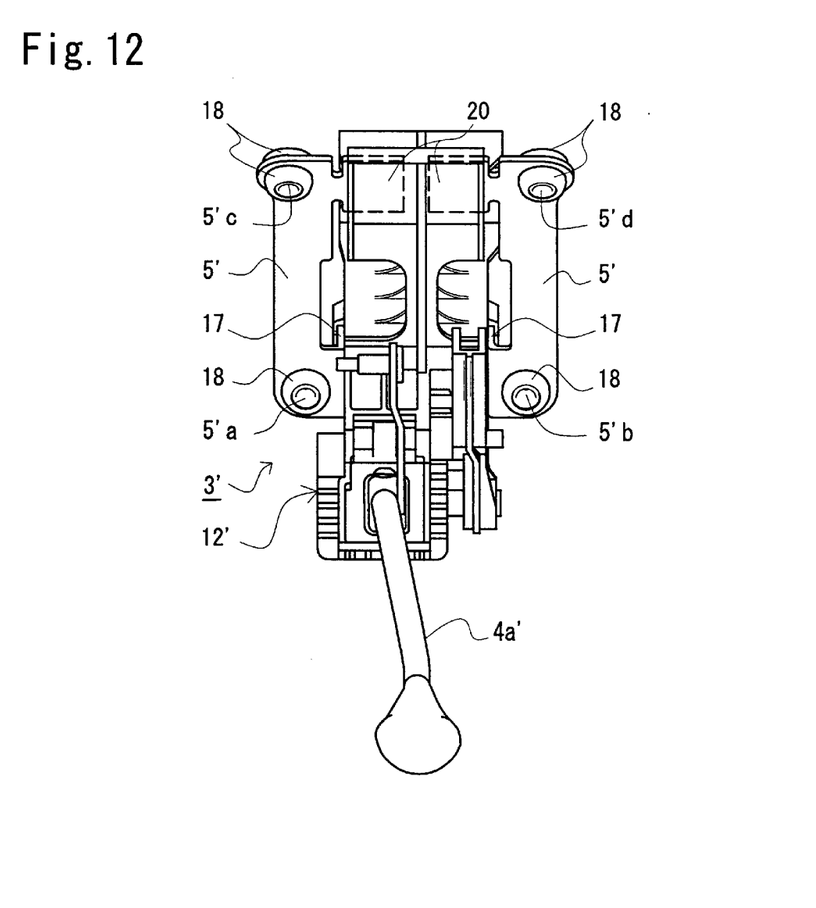
FIG. 12 is a plan view of a second embodiment of the shifting apparatus for a vehicle transmission of the present invention.

As shown in FIGS. 10 through 12, the shifting apparatus for a vehicle transmission 3' of the present invention comprises, as its main components, a body 12' of the shifting apparatus for a vehicle transmission, mounting brackets 5' as a mounting member, pin shaped insert portions 19 as a first shock absorbing member, and plate-shaped insert portions 20 as a second shock absorbing member.

The body 12' of the shifting apparatus comprises, as its main components, a shift lever 4a' to be manually operated by a driver, and a shift operation mechanism for transmitting the output of the shift lever 4a' to the transmission of the vehicle.

A mounting bracket 5' has bolt holes 5'a through 5'd and the body 12' of the shifting apparatus is secured to brackets supported on the body of the vehicle by bolts passed through the bolt holes. As shown in FIG. 10, one end of the mounting bracket 5' is formed with plate portions 17 for insert bent substantially perpendicular to the mounting bracket 5' and arranged proximately to the sides of the body 12' of the shifting apparatus. A reference numeral 18 denotes a bush.

The plate portion 17 for insert is formed with a plurality of holes for insert. A pin-shaped insert portion 19 projected from the body 12' of the shifting apparatus is formed in each of these holes for insert. A reference numeral 15 denotes a guard member which is also insert molded. The guard member 15 prevents the plate portion 17 for insert from being moved to a direction opposite to a direction shown by an arrow "f" and also prevents the plate portion 17 from being moved to a direction perpendicular to the sheet of drawing.

The pin-shaped insert portions are adapted to be broken when the shock load F is applied to the shift lever 4a'. The setting value of breakage of the pin-shaped insert portion 19 by the shock load F can be adjusted by changing the number, the dimension and the configuration etc. of the pin-shaped insert portion 19.

A part of the other end of the mounting bracket 5' is molded in the body 12' of the shifting apparatus and forms a plate-shaped insert portion 20. The plate-shaped insert portion 20 is adapted to be deformed over a predetermined stroke when the shock load F is applied to the shift lever 4a'. The setting value of deformation of the plate-shaped insert portion 20 by the shock load F can be adjusted by changing the dimension and the configuration etc. of the plate-shaped insert portion 20.

According to the structure described above, the plate portion 17 for insert of the mounting bracket 5' is moved toward the direction "f" relative to the body 12' of the shifting apparatus when the shock load F is applied to the shift operation section. Due to the movement of the plate portion 17, the pin-shaped insert portion 19 is broken and thus the initial shock load P1 is absorbed. On the other hand, the shock load P2 is absorbed due to the deformation of the plate-shaped portion 20 over a predetermined stroke when the shock load F is applied to the shift operation section.

Although it has described the second embodiment of the present invention, the shifting apparatus for a manual transmission can be replaced by that for an automatic transmission.

According to the second embodiment of present invention, it is possible to effectively absorb both the initial shock load P1 and the following shock load P2 merely by mounting pin-shaped and plate-shaped inserts on the mounting brackets 5' on manufacturing the body 12' of the shifting apparatus.

Finally, a third embodiment of the present invention will be described.

Figure 14:
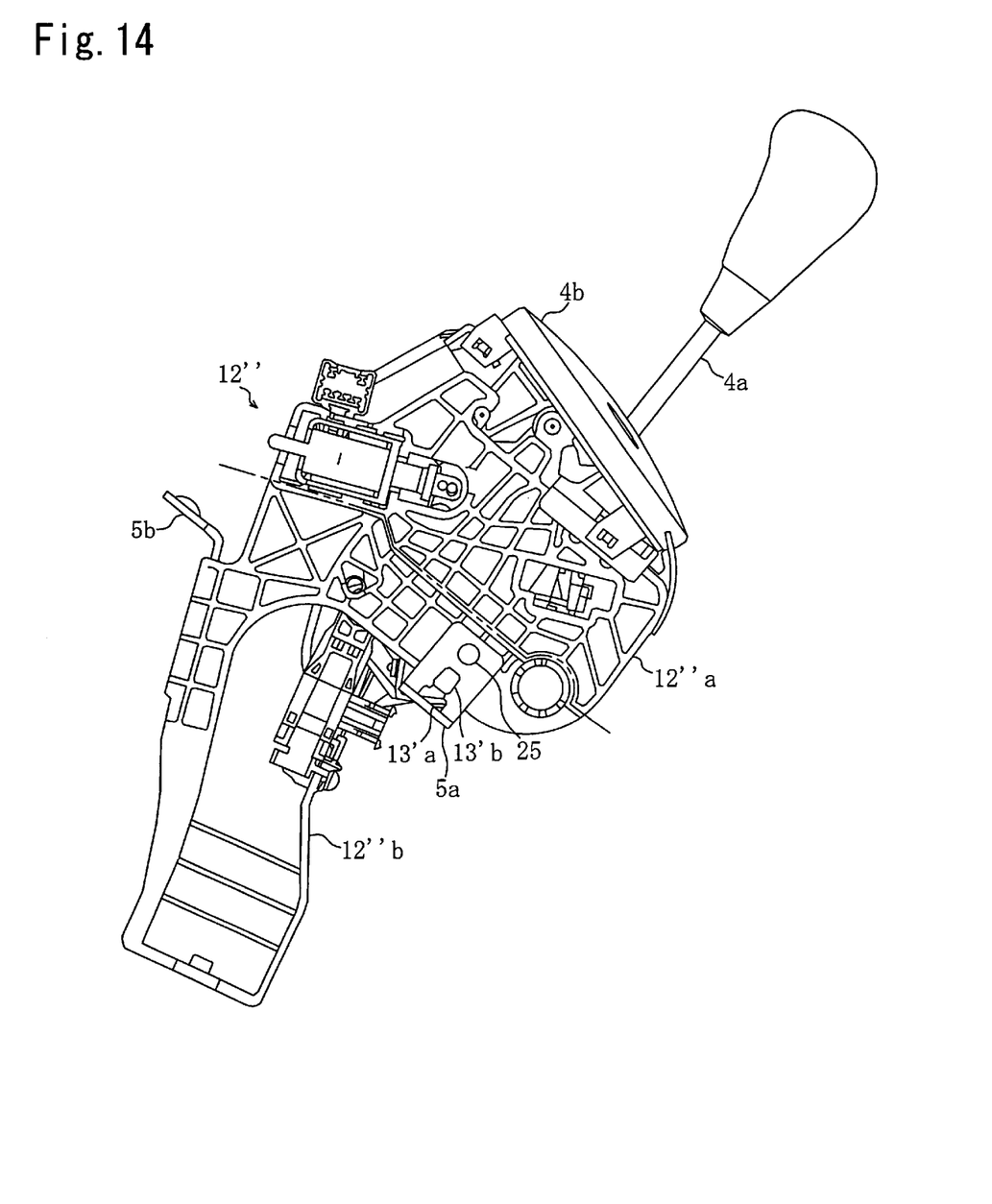
FIG. 14 is a side elevation view of a third embodiment of the shifting apparatus for a vehicle transmission of the present invention.

In the third embodiment, the shifting apparatus for a vehicle transmission comprises a body 12" which is vertically separated to two parts along a dotted line in FIG. 14, that is, an upper body 12"a and a lower body 12"b. The third embodiment of the present invention relates to mounting brackets 5a and 5b for the lower body 12"b of the shifting apparatus.

Figure 15:
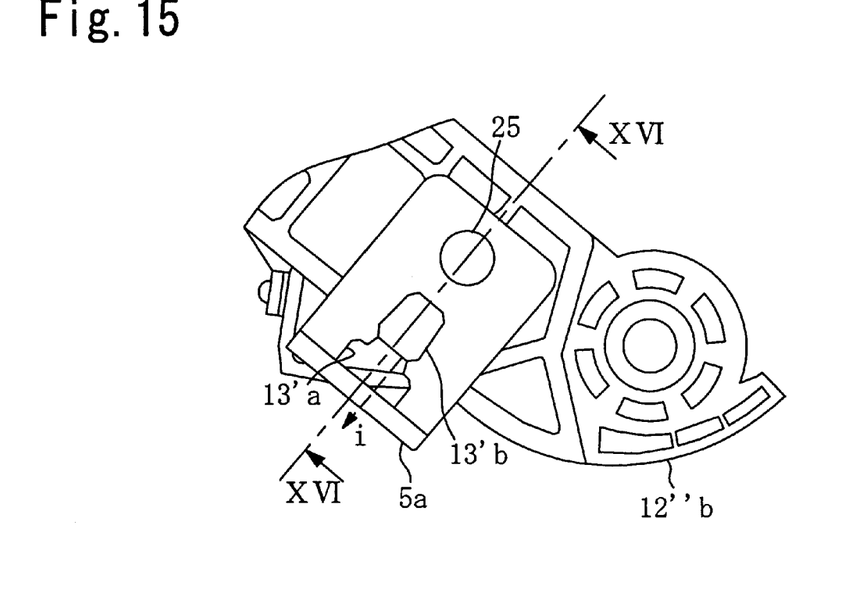
FIG. 15 is an enlarged view of a region near a mounting bracket of the shifting apparatus of FIG. 14.
Figure 16:
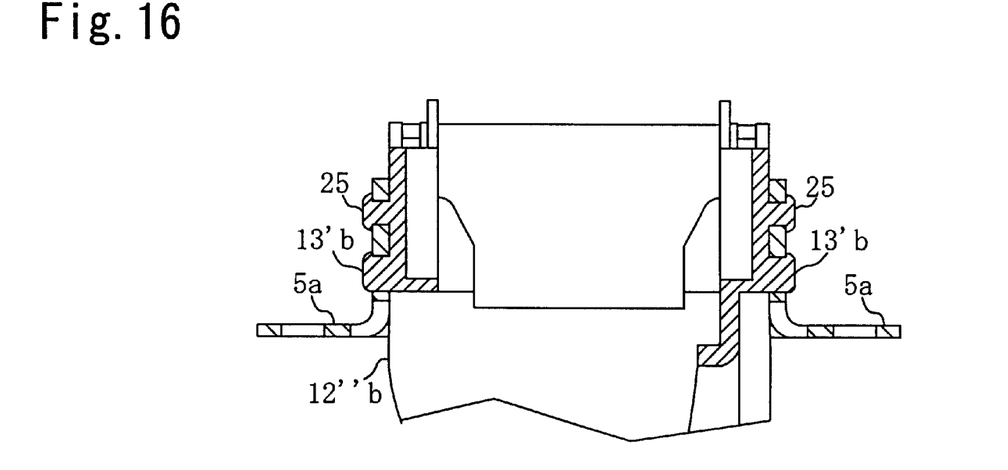
FIG. 16 is a sectional view taken along a line XVI—XVI in FIG. 15.

As shown in FIG. 15, the mounting bracket 5a has a pin-shaped insert portion 25 and a resin portion 13'b for guide fitted in a guide portion notch 13'a. As shown in FIG. 16, the pin-shaped insert portion 25 is that in which a pin-shaped resin projected from the side of the lower body 12"b and formed by insert molding is filled within a hole formed in the mounting bracket 5a. The resin portion 13'b for guide is that in which a resin formed extending from the lower body 12"b is fitted in the guide portion notch 13'a and a flanged portion formed on the top thereof is abutted against the top Surface of the mounting bracket 5a.

According to the third embodiment of the present invention, the pin-shaped insert portion 25 is broken when the shock load F is applied and absorbs the initial shock load P1. On the other hand, the resin portion 13'b for guide is moved toward a direction of an arrow "i" in FIG. 15 with being guided by the guide portion notch 13'a. The degree of absorption of the initial shock load P1 can be adjusted by changing the diameter or the number of the pin-shaped insert portion 25.

In FIG. 14, same reference numerals are used as to same components used in the first embodiment. The means for absorbing the shock load P2 to be formed in the mounting bracket 5b is same as that used in the first embodiment.

As stated above, according to the present invention since the absorption of the shock load can be carried out by separate structural elements having different shock absorbing characteristics and the initial shock load can be absorbed by the breakage of the structural elements, it is possible to adjust the shock absorbing characteristics of the shock absorbing members with keeping the static strength of them.

According to the present invention, since the initial shock load can be absorbed by the breakage of the ribs formed integrally with the shift operation section, it is possible to absorb the initial shock load with a low cost and a simple structure.

According to the present invention, since the shock load can be absorbed by the breakage or the deformation of the plate-shaped portions and the restraining portions formed integrally with the shift operation section, it is possible to absorb the shock load over a predetermined stroke with a low cost and a simple structure.

According to the present invention, since the plate-shaped portion is deformed along the slit, it is possible to easily adjust the setting value of deformation of the plate-shaped portion by changing the width, the longitudinal dimension or the configuration etc. of the slit.

According to the present invention, since the restraining portions are broken by the projections, it is possible to absorb the shock load over a predetermined stroke with a low cost and a simple structure.

According to the present invention, since the surface of the projection abutting the restraining portion is offset at a predetermined angle, it is possible to easily adjust the setting value of breakage of the restraining portions merely by changing the offset angle.

According to the present inventions, since the shock load can be absorbed by the insert portion, it is possible to obtain the effect of the invention with a low cost and a simple structure.

What is claimed is:

1. A shifting apparatus for a vehicle transmission comprising:
   a shifter housing for pivotally supporting an operation lever for pivoting the operation lever in the shifter housing, mounting members separate from a shift operation section for arranging the shifter housing at an instrument panel portion of the vehicle or at a near region thereof; and
   said mounting members are adapted to mount the shifter housing on the vehicle at at least two places, and at least one of the mounting members is provided with a first shock absorbing member adapted to be broken to absorb an initial shock load as well as a second shock absorbing member adapted to be deformed or broken over a predetermined-stroke to absorb a shock load following the initial shock load when a shock load exceeding a predetermined value is applied to the shifter housing.

2. A shifting apparatus for a vehicle transmission of claim 1 wherein said first shock absorbing member is a rib formed integrally with the shift operation section and adapted to be broken by each of the mounting member displaced relatively to the shift operation section when said shock load is applied to the shift operation section.

3. A shifting apparatus for a vehicle transmission of claim 1 wherein said second shock absorbing member comprises a plate-shaped portion extending from the mounting member and a restraining portion formed integrally with the shift operation section for restraining the plate-shaped portion.

4. A shifting apparatus for a vehicle transmission of claim 3 wherein said plate-shaped portion is formed with a slit for aiding the deformation of the plate-shaped portion when the shock load is applied to the shift operation section.

5. A shifting apparatus for a vehicle transmission of claim 3 wherein said plate-shaped portion is formed with projections for deforming or breaking the restraining portion during relative movement between the plate-shaped portion and the shift operation section when the shock load is applied to the shift operation section.

6. A shifting apparatus for a vehicle transmission of claim 5 wherein the surfaces of the projections of the plate-shaped portion is offset from the direction of the relative movement between the plate-shaped portion and the shift operation section.

7. A shifting apparatus for a vehicle transmission of claim 1 wherein said first shock absorbing member and said second shock absorbing member comprise insert portions connecting the shift operation section and the mounting member.

8. A shifting apparatus for a vehicle transmission of claim 7 wherein said first shock absorbing member comprises pin-shaped insert portions.

9. A shifting apparatus for a vehicle transmission of claim 7 wherein said second shock absorbing member comprises plate-shaped insert portions.

10. A shifting apparatus for a vehicle transmission comprising:
    a shifter housing for pivotally supporting an operation lever for pivoting the operation lever in the shifter housing, mounting members for arranging the shifter housing at an instrument panel portion of the vehicle or at a near region thereof;
    said mounting members are adapted to mount the shifter housing on the vehicle at at least two places, and at least one of the mounting members is provided with a first shock absorbing member adapted to be broken to absorb an initial shock load as well as a second shock absorbing member adapted to be deformed or broken over a predetermined stroke to absorb a shock load following the initial shock load when a shock load exceeding a predetermined value is applied to the shifter housing and said operation lever being operable in said shifter housing after the load has been applied.

11. A shifting apparatus for a vehicle transmission of claim 10 wherein said first shock absorbing member is a rib formed integrally with the shift operation section and adapted to be broken by each of the mounting member displaced relatively to the shift operation section when said shock load is applied to the shift operation section.

12. A shifting apparatus for a vehicle transmission of claim 10 wherein said second shock absorbing member comprises a plate-shaped portion extending from the mounting member and a restraining portion formed integrally with the shift operation for restraining the plate-shaped portion.

13. A shifting apparatus for a vehicle transmission of claim 12 wherein said plate-shaped portion is formed with a slit for aiding the deformation of the plate-shaped portion when the shock load is applied to the shift operation section.

14. A shifting apparatus for a vehicle transmission of claim 12 wherein said plate-shaped portion is formed with projections for deforming or breaking the restraining portion during relative movement between the plate-shaped portion and the shift operation section when the shock load is applied to the shift operation section.

15. A shifting apparatus for a vehicle transmission of claim 14 wherein the surfaces of the projections of the plate-shaped portion is offset from the direction of the relative movement between the plate-shaped portion and the shift operation section.

16. A shifting apparatus for a vehicle transmission of claim 10 wherein said first shock absorbing member and said second shock absorbing member comprise insert portions connecting the shift operation section and the mounting member.

17. A shifting apparatus for a vehicle transmission of claim 16 wherein said first shock absorbing member comprises pin-shaped insert portions.

18. A shifting apparatus for a vehicle transmission of claim 16 wherein said second shock absorbing member comprises plate-shaped insert portions.

* * * * *